(12) United States Patent
McQuillen et al.

(10) Patent No.: US 12,158,214 B2
(45) Date of Patent: Dec. 3, 2024

(54) ROTARY REFRIGERANT VALVE FOR AUTOMOTIVE HEAT PUMP CONTROL

(71) Applicant: Atieva, Inc., Newark, CA (US)

(72) Inventors: Isaac McQuillen, Redwood City, CA (US); Arash Moharreri, Fremont, CA (US)

(73) Assignee: Atieva, Inc., Newark, CA (US)

( * ) Notice: Subject to any disclaimer, the term of this patent is extended or adjusted under 35 U.S.C. 154(b) by 23 days.

(21) Appl. No.: 18/192,615

(22) Filed: Mar. 29, 2023

(65) Prior Publication Data

US 2023/0417333 A1    Dec. 28, 2023

Related U.S. Application Data

(60) Provisional application No. 63/366,957, filed on Jun. 24, 2022.

(51) Int. Cl.
*F16K 11/085* (2006.01)
*B60H 1/00* (2006.01)
(Continued)

(52) U.S. Cl.
CPC ...... *F16K 11/0856* (2013.01); *B60H 1/00278* (2013.01); *B60H 1/00485* (2013.01);
(Continued)

(58) Field of Classification Search
CPC ...... F16K 11/0856; B60H 2001/00307; B60H 1/00278; B60H 1/00485; F25B 5/02; F25B 41/20; F25B 41/26; F25B 2600/2515
See application file for complete search history.

(56) References Cited

U.S. PATENT DOCUMENTS 3,021,869 A * 2/1962 Ross ............... F15B 13/04
                                                137/625.24
3,502,110 A * 3/1970 Ogilvie ............ F15B 11/126
                                                137/625.11
(Continued)

FOREIGN PATENT DOCUMENTS

JP    2010261564 A  * 11/2010
WO    2012086746 A1    6/2012
WO    2022099892 A1    5/2022

OTHER PUBLICATIONS

International Search Report and Written Opinion for PCT Application No. PCT/US2023/068506, mailed on Oct. 10, 2023, 16 pages.

*Primary Examiner* — Atif H Chaudry
(74) *Attorney, Agent, or Firm* — Brake Hughes Bellermann LLP

(57) ABSTRACT

A rotary valve comprises: a valve body having a cylindrical cavity; a rotor having a cylindrical surface that abuts a surface of the cylindrical cavity, the rotor including: a center bore; a first channel extending between the center bore and a first opening in the cylindrical surface; a second channel extending between the center bore and a second opening in the cylindrical surface; a third channel extending between the center bore and a third opening in the cylindrical surface; and a fourth channel not connected to the center bore, the fourth channel extending between a fourth opening in the cylindrical surface and a fifth opening at an end surface of the rotor, the end surface adjacent the cylindrical surface; and ports extending through the valve body between the surface of the cylindrical cavity and an outside of the valve body.

19 Claims, 11 Drawing Sheets

(51) Int. Cl.
  *F25B 5/02*   (2006.01)
  *F25B 41/20*  (2021.01)
  *F25B 41/26*  (2021.01)

(52) U.S. Cl.
  CPC ............... *F25B 5/02* (2013.01); *F25B 41/20* (2021.01); *F25B 41/26* (2021.01); *B60H 2001/00307* (2013.01); *F25B 2600/2515* (2013.01)

(56) References Cited

U.S. PATENT DOCUMENTS

| | | | | |
|---|---|---|---|---|
| 5,060,693 | A | * | 10/1991 | Smith ................ F16K 11/0856 137/625.23 |
| 5,431,189 | A | * | 7/1995 | Jones ..................... F25B 45/00 137/625.42 |
| 5,927,330 | A | * | 7/1999 | Minton ................ F16K 11/085 251/367 |
| 9,511,645 | B2 | | 12/2016 | Johnston |
| 9,527,404 | B2 | | 12/2016 | Gauthier et al. |
| 9,895,953 | B2 | | 2/2018 | Feltham |
| 2010/0191106 | A1 | * | 7/2010 | Koyama ............ A61M 39/223 600/431 |
| 2010/0319796 | A1 | * | 12/2010 | Whitaker ............. F16K 11/085 137/625.46 |
| 2018/0224006 | A1 | | 8/2018 | Killip |
| 2021/0381608 | A1 | | 12/2021 | Römer et al. |

\* cited by examiner

ROTARY REFRIGERANT VALVE FOR AUTOMOTIVE HEAT PUMP CONTROL

CROSS-REFERENCE TO RELATED APPLICATION

This application claims benefit, under 35 U.S.C. § 119, of U.S. Provisional Patent Application No. 63/366,957, filed on Jun. 24, 2022, entitled "ROTARY REFRIGERANT VALVE FOR AUTOMOTIVE HEAT PUMP CONTROL," the disclosure of which is incorporated by reference herein in its entirety.

TECHNICAL FIELD

This document relates to a rotary refrigerant valve that can be used for automotive heat pump control.

BACKGROUND

Automotive manufacturers continue to develop their thermal systems to meet changing demands in terms of increased efficiency, increased capacity, or smaller size. For example, increasing efficiency can involve improving or optimizing the way the thermal system's performance affects range of the vehicle. As another example, increasing capacity can involve designing the thermal system to handle significant thermal load from components such as a battery pack, or to provide heating of the cabin. As another example, reducing the size of components of the thermal system can help reduce the overall weight of the vehicle or save space for other use.

SUMMARY

In a first aspect, a rotary valve comprises: a valve body having a cylindrical cavity; a rotor having a cylindrical surface that abuts a surface of the cylindrical cavity, the rotor including: a center bore; a first channel extending between the center bore and a first opening in the cylindrical surface; a second channel extending between the center bore and a second opening in the cylindrical surface; a third channel extending between the center bore and a third opening in the cylindrical surface; and a fourth channel not connected to the center bore, the fourth channel extending between a fourth opening in the cylindrical surface and a fifth opening at an end surface of the rotor, the end surface adjacent the cylindrical surface; and ports extending through the valve body between the surface of the cylindrical cavity and an outside of the valve body.

Implementations can include any or all of the following features. The first opening has substantially a first rectangular shape on the cylindrical surface, a longer side of the first rectangular shape extending circumferentially along a direction of rotation of the rotor. The third opening has substantially a second rectangular shape on the cylindrical surface, a longer side of the second rectangular shape extending circumferentially along the direction of rotation of the rotor. The longer side of the first rectangular shape is longer than the longer side of the second rectangular shape. The center bore has substantially a cylindrical shape. The rotor consists of a single piece of material without any joints, and wherein the first, second, third, and fourth channels are machined into the single piece of material. The first and second openings are positioned opposite each other across the center bore. The first and third openings are positioned on opposite sides of the center bore and are offset from each other along a rotation axis of the rotor. The rotary valve further comprises a check valve in the valve body. The check valve faces the end surface of the rotor. The rotary valve further comprises a spring that biases the check valve, the spring retained by a fitting attached to at least one of the ports. The rotary valve further comprises an actuator attached to the valve body, the actuator configured to rotate the rotor within the cylindrical cavity. The rotary valve has a first mode of operation corresponding to a first rotational position of the rotor within the cylindrical cavity, wherein in the first rotational position of the rotor: the first opening in the cylindrical surface faces a first port of the ports; the second opening in the cylindrical surface faces a second port of the ports; the third opening in the cylindrical surface is covered by a part of the surface of the cylindrical cavity; and the fifth opening at the end surface of the rotor is covered by the valve body. The rotary valve further has also a second mode of operation corresponding to a second rotational position of the rotor within the cylindrical cavity, wherein in the second rotational position of the rotor: the first opening in the cylindrical surface faces the first port; the second opening in the cylindrical surface faces the second port; the third opening in the cylindrical surface faces a third port of the ports; and the fifth opening at the end surface of the rotor is covered by the valve body. The second mode of operation corresponds to each of multiple second rotational positions of the rotor within the cylindrical cavity, the multiple second rotational positions of the rotor corresponding to respective different proportions between flow through the first channel and flow through the second channel. The rotary valve further has also a third mode of operation corresponding to a third rotational position of the rotor within the cylindrical cavity, wherein in the third rotational position of the rotor: the first opening in the cylindrical surface faces the first port; the second opening in the cylindrical surface is covered by another part of the surface of the cylindrical cavity; the third opening in the cylindrical surface faces the third port; and the fifth opening at the end surface of the rotor is covered by the valve body. The rotary valve further has also a fourth mode of operation corresponding to a fourth rotational position of the rotor within the cylindrical cavity, wherein in the fourth rotational position of the rotor: the first opening in the cylindrical surface faces the first port; the second opening in the cylindrical surface is covered by the other part of the surface of the cylindrical cavity; the third opening in the cylindrical surface faces the third port; the fourth opening faces the second port; and the fifth opening at the end surface of the rotor faces a fourth port of the ports. A portion of the fourth channel ending at the fifth opening at the end surface of the rotor is substantially parallel with the center bore.

In a second aspect, a rotary valve comprises: a valve body having a cylindrical cavity; first, second, third, and fourth ports, each of the first, second, third, and fourth ports extending through the valve body between a surface of the cylindrical cavity and an outside of the valve body; and a rotor having a cylindrical surface that abuts the surface of the cylindrical cavity, the rotor including: first means for conducting flow in a first mode of operation, wherein in the first mode of operation the first port is connected only to the second port, and the flow does not reach the third and fourth ports; second means for conducting flow in a second mode of operation, wherein in the second mode of operation the first port is connected only to the second and third ports, and the flow does not reach the fourth port; third means for conducting flow in a third mode of operation, wherein in the third mode of operation the first port is connected only to the third port, and the flow does not reach the second and fourth ports; and fourth means for conducting flow in a fourth mode of operation, wherein in the fourth mode of operation the first port is connected only to the third port, and the second port is connected only to the fourth port.

Implementations can include any or all of the following features. The second means further controls a proportion between (i) flow between the first port and the second port, and (ii) flow between the first port and the third port.

BRIEF DESCRIPTION OF DRAWINGS

Like reference symbols in the various drawings indicate like elements.

DETAILED DESCRIPTION

This document describes examples of systems and techniques that provide a compact rotary valve. In some implementations, the rotary valve can be used in an automotive thermal system of a vehicle (e.g., an electric vehicle). For example, a heat pump of an electric vehicle can advantageously be controlled in any of multiple modes of operation.

The present subject matter can provide a compact rotary-style refrigerant valve, consisting of a single actuator, a single rotor, a valve body with refrigerant line interfaces, an integrated check valve, and the sealing materials around all flow paths and assembly points where necessary. The rotor can have machined passageways in multiple axes to use space more efficiently and to keep the valve compact. The present subject matter can facilitate multiple (e.g., four or more) distinct operational modes with one rotor in a small, compact package. Operational modes can include, but are not limited to: ambient air condenser mode, proportioning mode, cabin heating condenser mode, or charge management mode. A check valve can be integrated into the valve body to prevent unintended reverse flow while in charge management mode.

Advantages of the present subject matter can include one or more of the following. The present subject matter can control refrigerant flow proportioning between an ambient air condenser and a condenser for automotive cabin heating. The present subject matter can control proper heat recovery from the cabin heating condenser, allowing excess heat to be rejected simultaneously at the ambient air condenser by metering refrigerant flow. The present subject matter can facilitate refrigerant charge management between two condensers to ensure proper heat pump operation. In the present subject matter, a control check valve can be integrated into the valve body to prevent unintended reverse flow while in charge management mode or other operational modes. The present subject matter can provide a single rotor and actuator to realize a single, compact passage for fluid.

Examples described herein refer to coupling of two or more components, or connecting them to each other. Unless otherwise indicated, coupling of components or connecting them together means to enable flow of a fluid in one or more directions between the components. The fluid flow can include, but is not limited to, passage of refrigerant in liquid and/or gaseous form.

Examples described herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
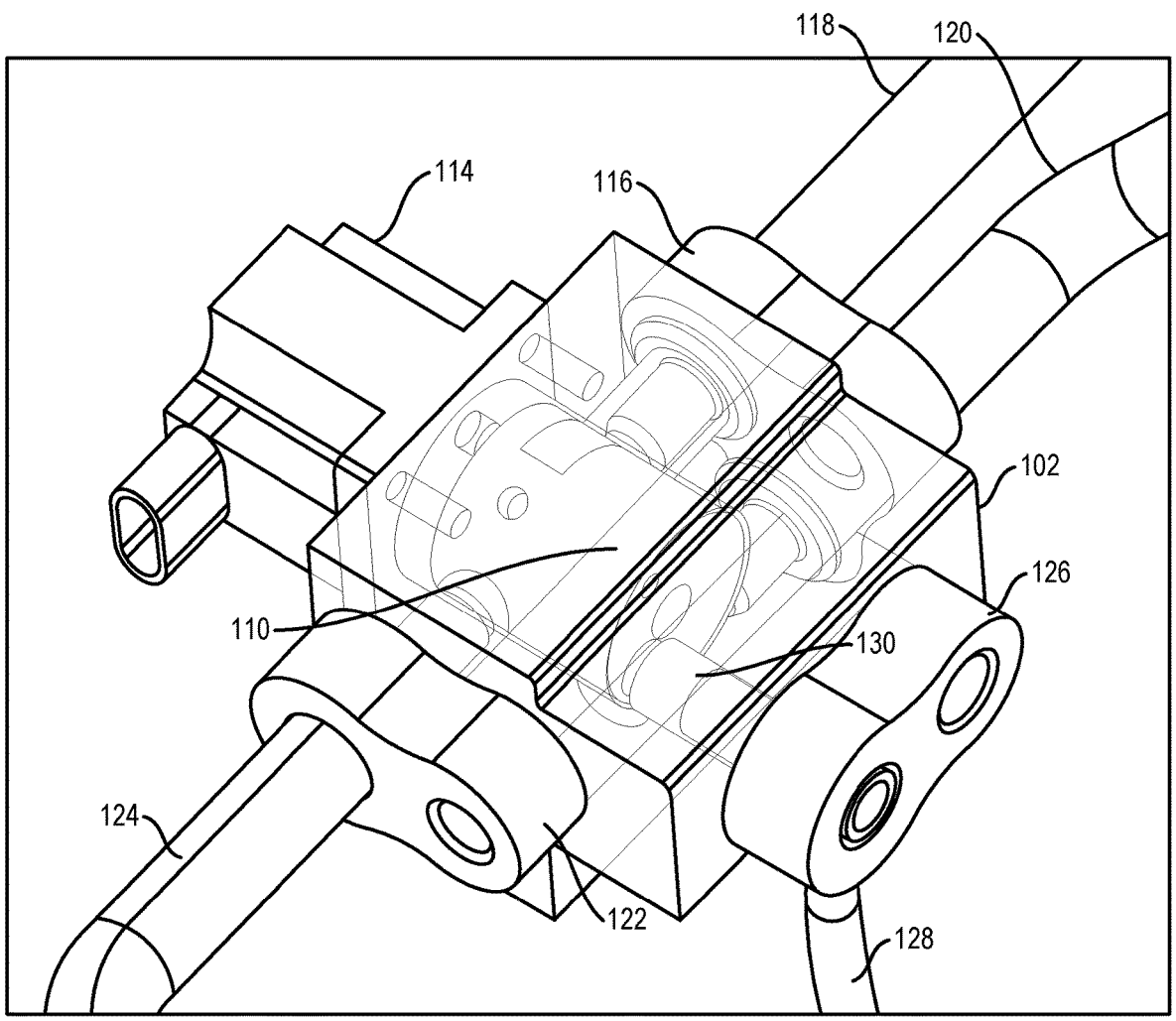
FIG. 1 shows a perspective view of an example of a rotary valve.
Figure 2:
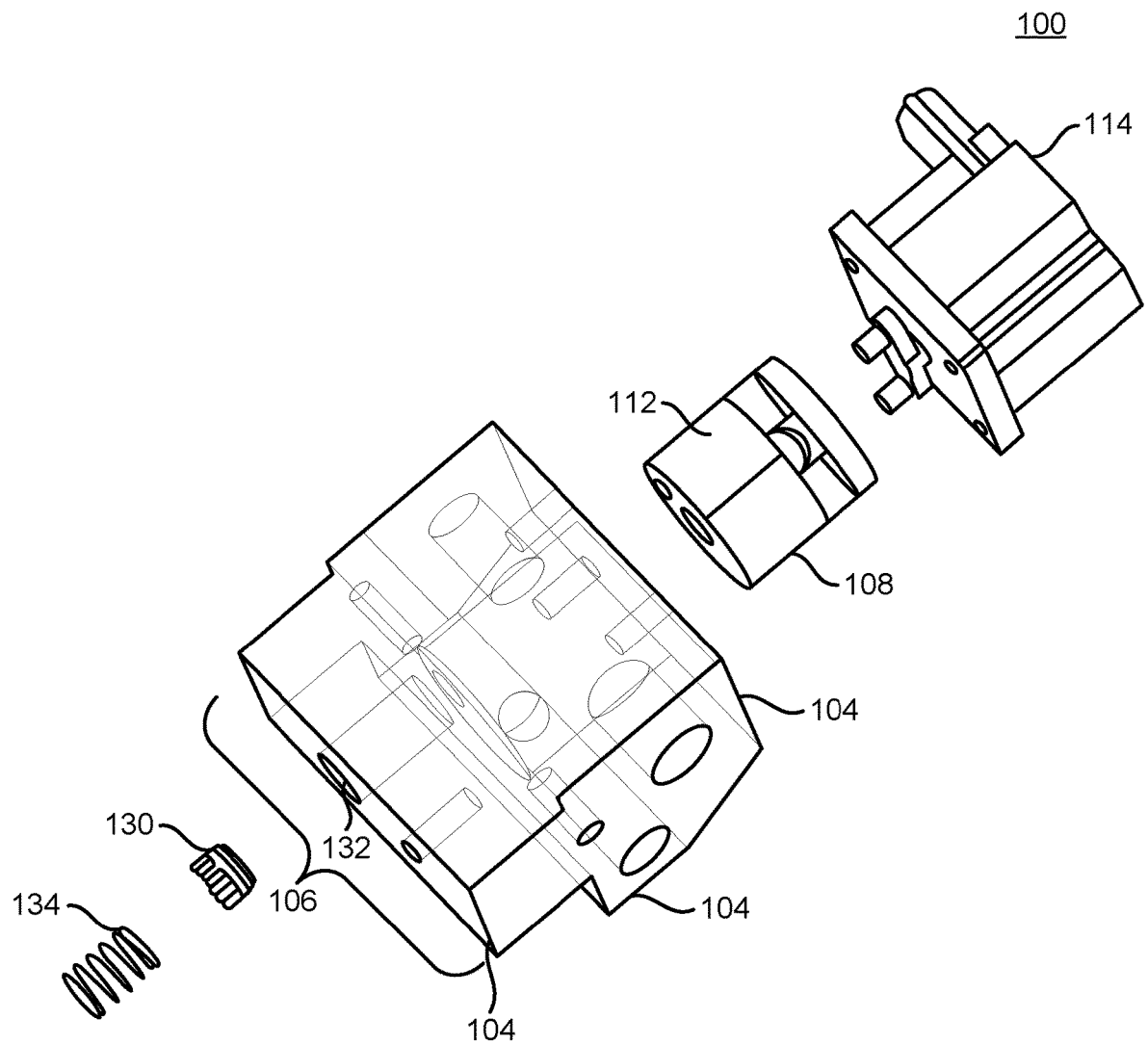
FIG. 2 shows an exploded view of the rotary valve in FIG. 1.

FIG. 1 shows a perspective view of an example of a rotary valve 100. FIG. 2 shows an exploded view of the rotary valve 100 in FIG. 1. The rotary valve 100 can be used with one or more other examples described elsewhere herein. The rotary valve 100 includes a valve body 102. The valve body 102 can have any shape. In some implementations, the valve body 102 has a profile 104 (e.g., of polygonal shape), and the exterior surface of the rotary valve 100 over a length 106 can be substantially defined by the profile 104. The valve body 102 can be made of any of multiple materials compatible with the intended use (e.g., controlling the flow of refrigerant), including, but not limited to, metal or a composite material (e.g., polymer). The valve body 102 can provide interfaces for mating air-conditioning fittings, a rotor, and an actuator.

The rotary valve 100 includes a rotor 108 positioned within a cylindrical cavity 110. The rotor 108 includes a cylindrical surface 112 that abuts a surface of the cylindrical cavity 110. The rotary valve 100 includes an actuator 114 attached to the valve body 102. The actuator 114 can be configured to rotate the rotor 108 within the cylindrical cavity 110. For example, the actuator 114 can include an electric motor or other electromagnetic device that can be controlled for selectively placing the rotor 108 in any of multiple rotational positions. Seals can be placed between the valve body 102 and the rotor 108, and/or between the valve body 102 and the actuator 114.

The rotary valve 100 includes a fitting 116 for coupling the rotary valve 100 to one or more components of a thermal system. In some implementations, a pipe 118 which is here partially shown can be coupled to the valve body 102 using the fitting 116. For example, the pipe 118 can couple the rotary valve 100 to a discharge outlet of a compressor (not shown). In some implementations, a pipe 120 which is here partially shown can be coupled to the valve body 102 using the fitting 116. For example, the pipe 120 can couple the rotary valve 100 to a cabin heating condenser and/or a liquid-cooled condenser. The rotary valve 100 includes a fitting 122 for coupling the rotary valve 100 to one or more components of a thermal system. In some implementations, a pipe 124 which is here partially shown can be coupled to the valve body 102 using the fitting 122. For example, the pipe 124 can couple the rotary valve 100 to an ambient air cooled condenser (not shown). The rotary valve 100 includes a fitting 126 for coupling the rotary valve 100 to one or more components of a thermal system. In some implementations, a pipe 128 which is here partially shown can be coupled to the valve body 102 using the fitting 126. For example, the pipe 128 can couple the rotary valve 100 to a suction line of a compressor (not shown). In some implementations, the rotary valve 100 includes a check valve 130 that can prevent unintended reverse flow of fluid, such as during a mode of operation that involves charge management or other operation modes. In some implementations, the check valve 130 can be positioned in an opening 132 of the valve body 102. A spring 134 can be positioned in a compressed state to bias the check valve 130. For example, the fitting 126 can be positioned so as to compress the spring 134.

Figure 3:
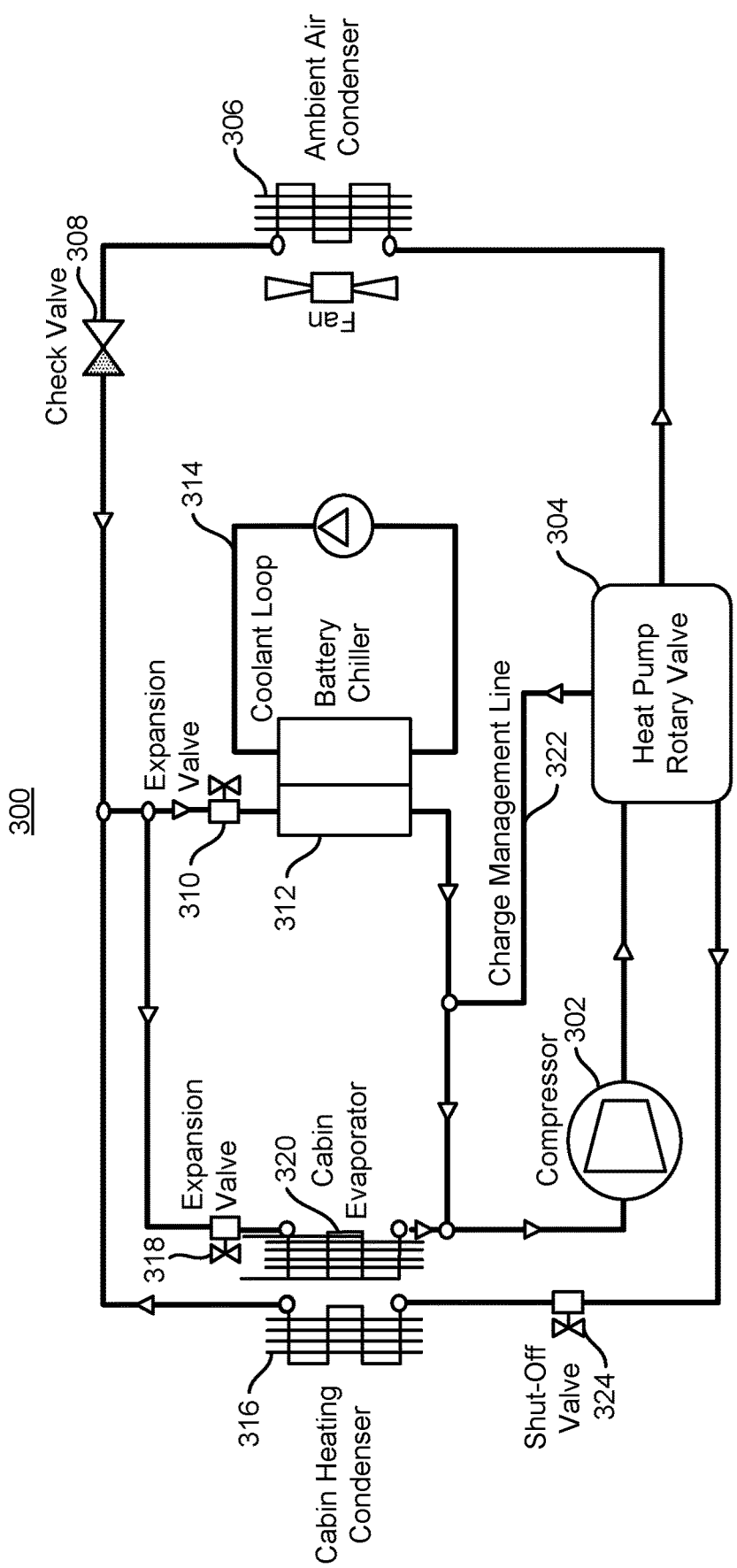
FIG. 3 shows an example of a thermal system in which the rotary valve of FIG. 1 can be used.
Figure 4:
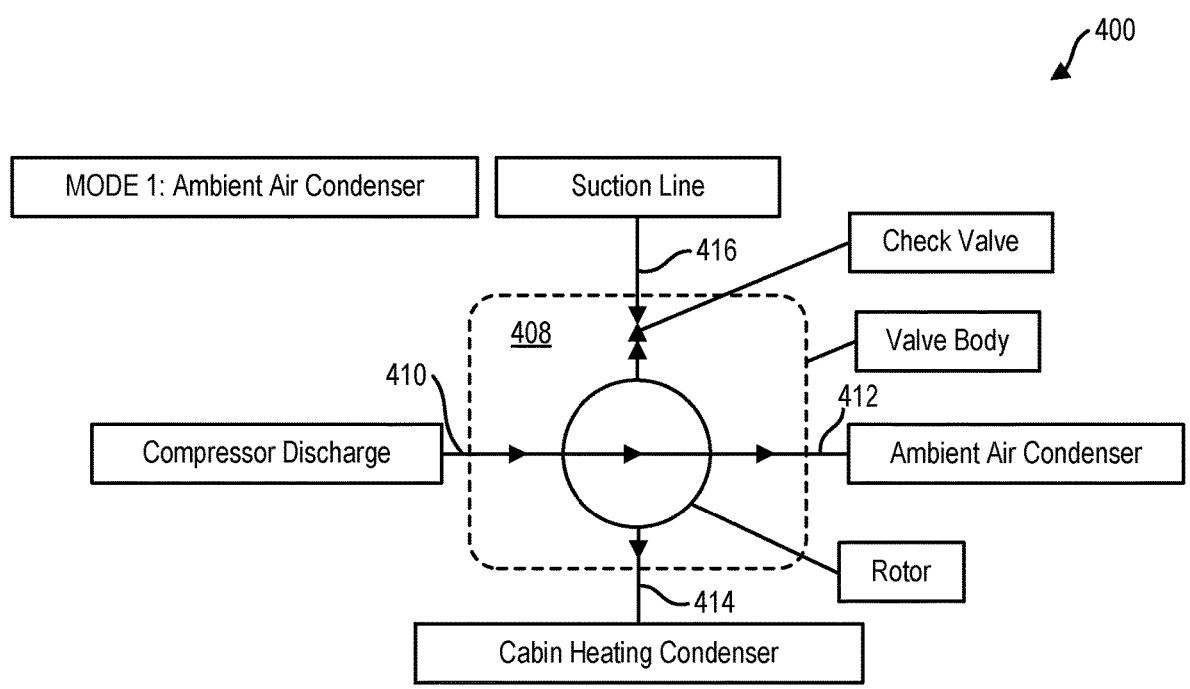
FIGS. 4-7 schematically show examples of modes of operation for a rotary valve.
Figure 5:
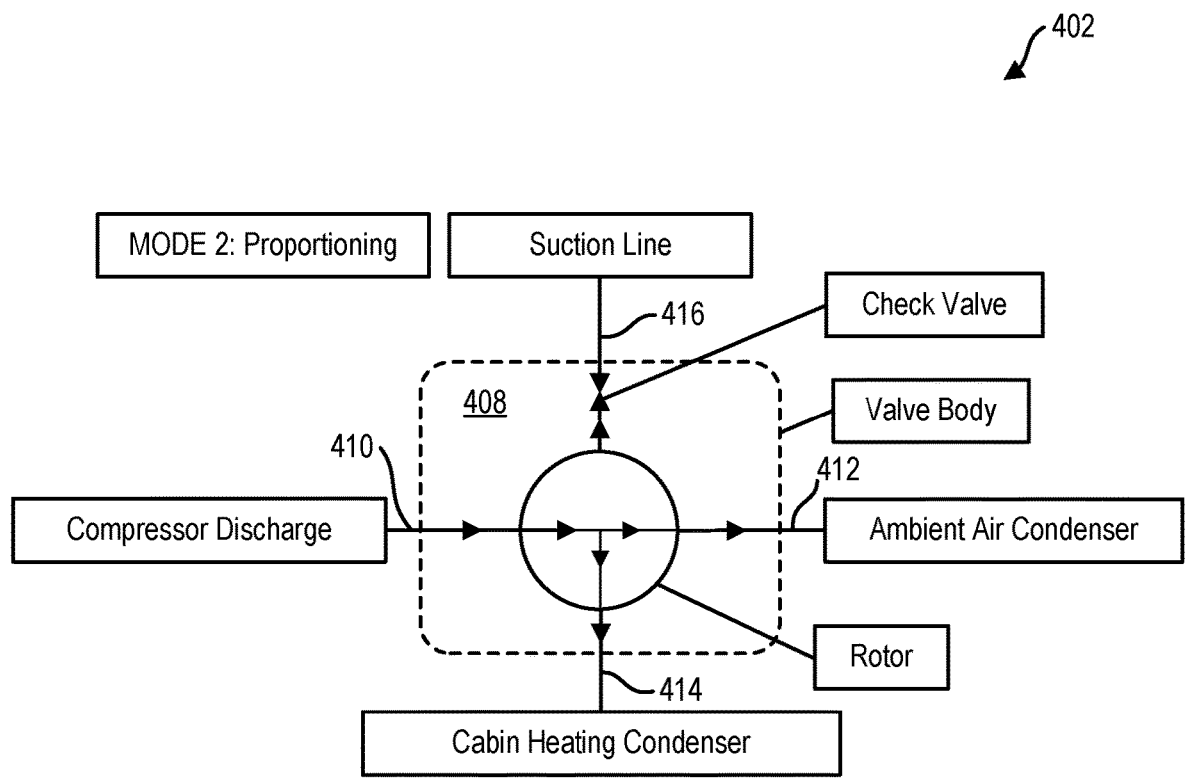
Figure 6:
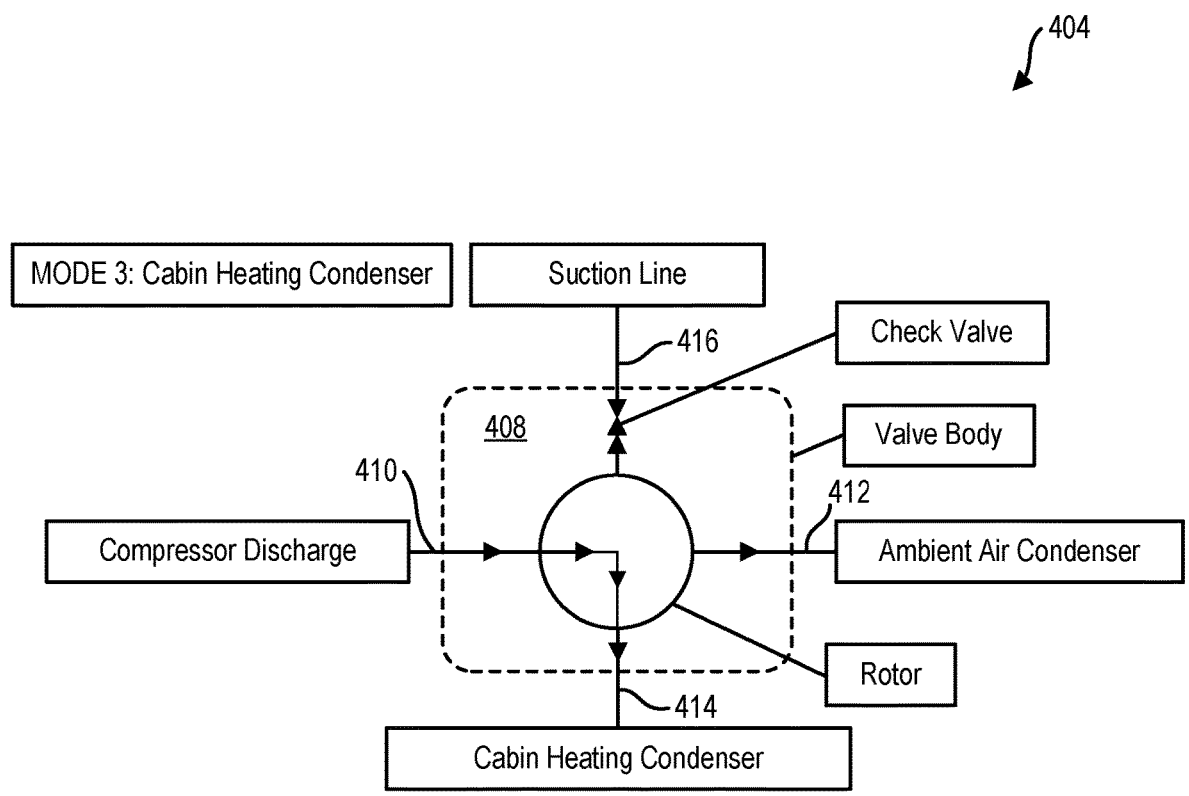
Figure 7:
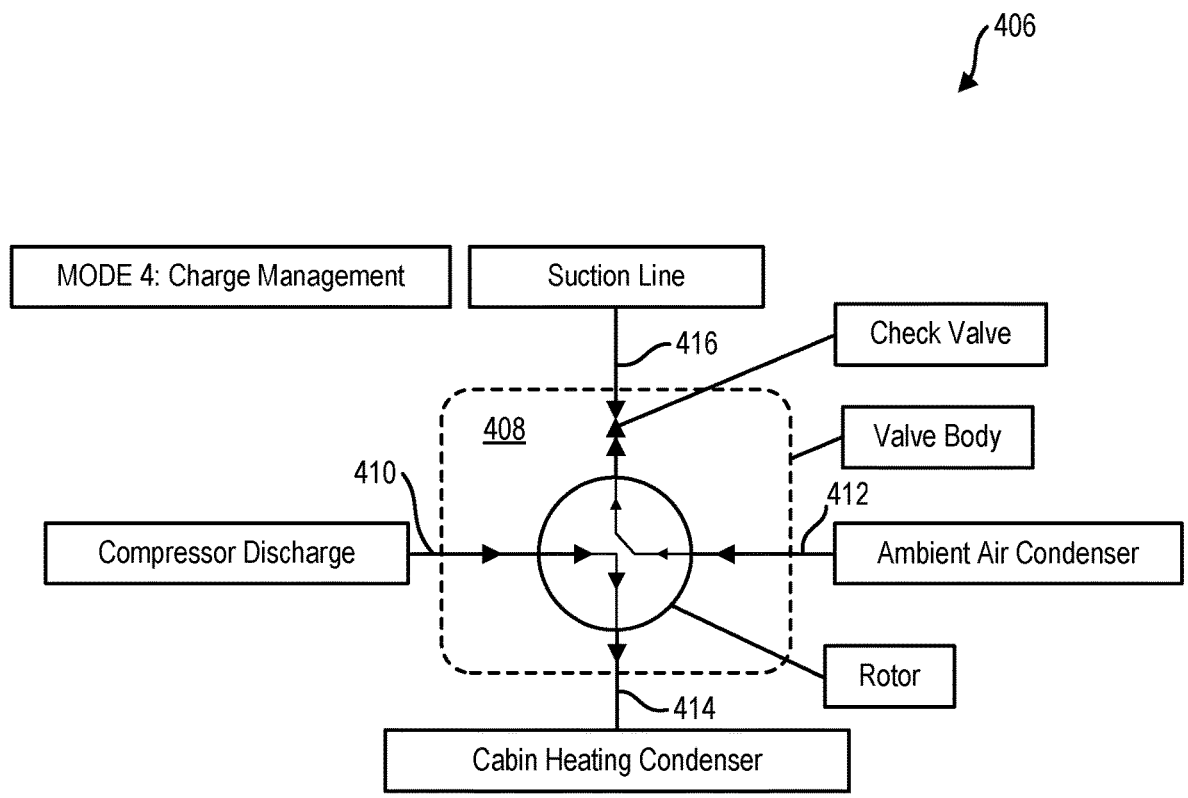
Figure 8:
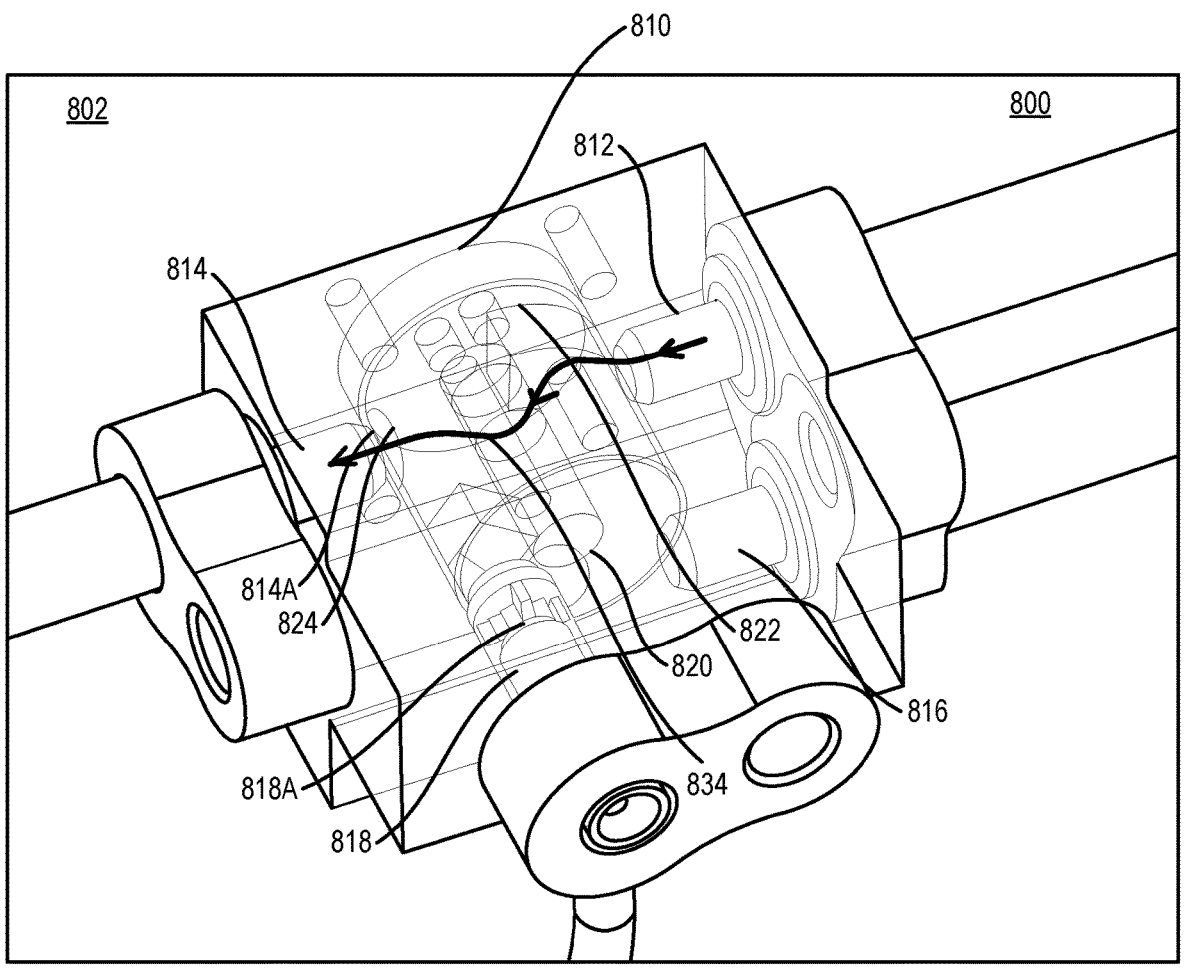
FIGS. 8-11 show examples of a rotary valve according to modes of operation.
Figure 9:
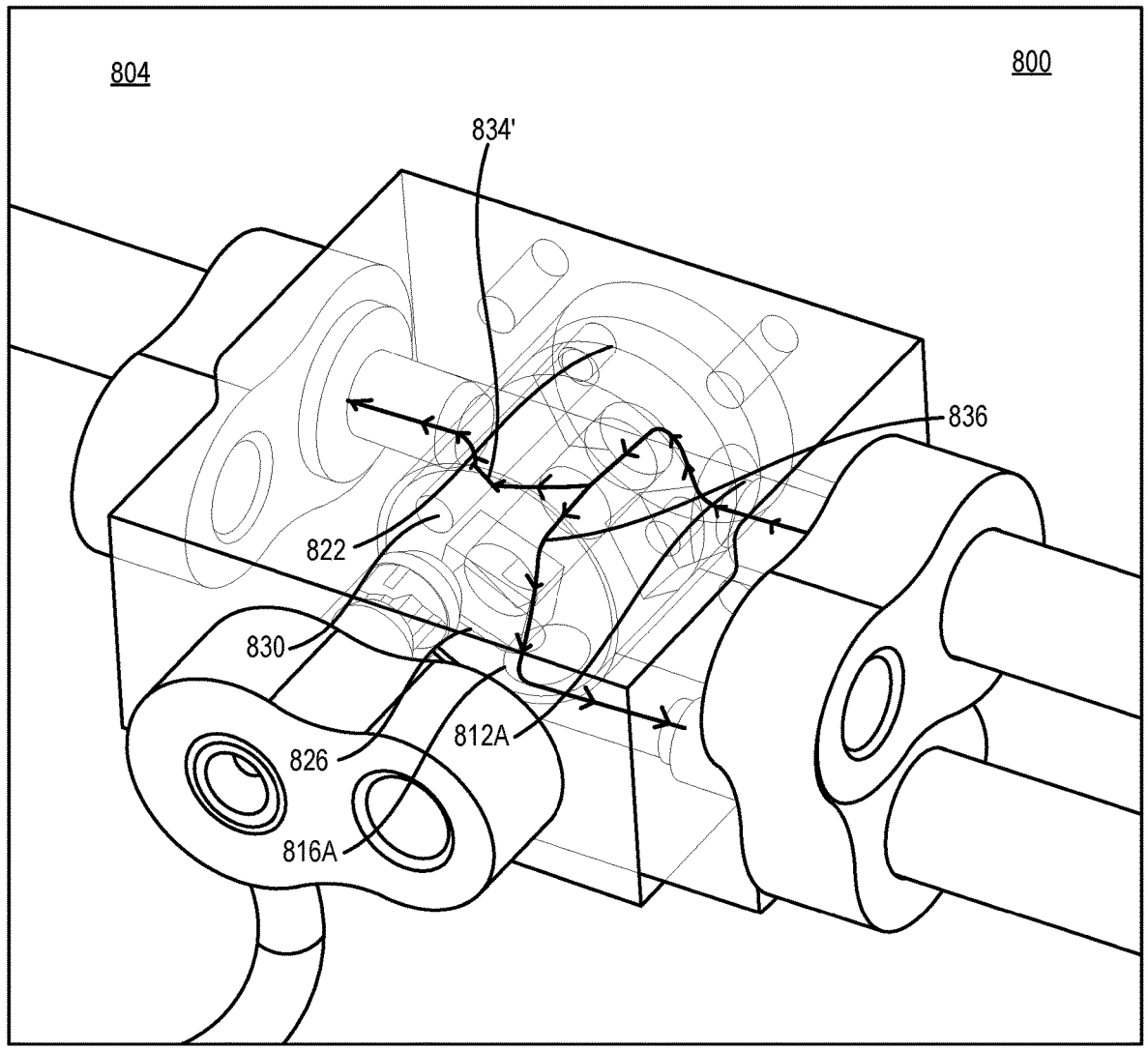
Figure 10:
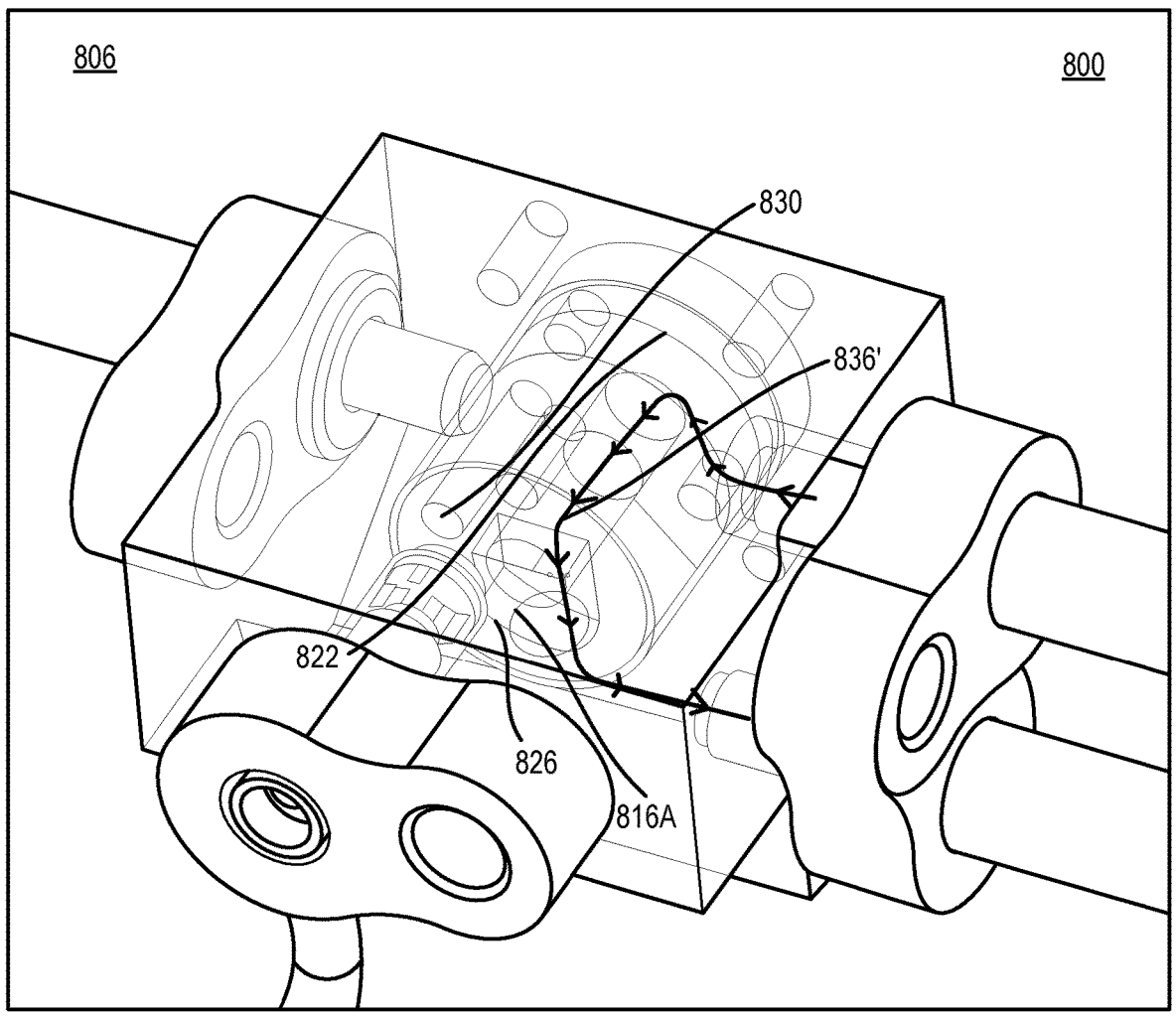
Figure 11:
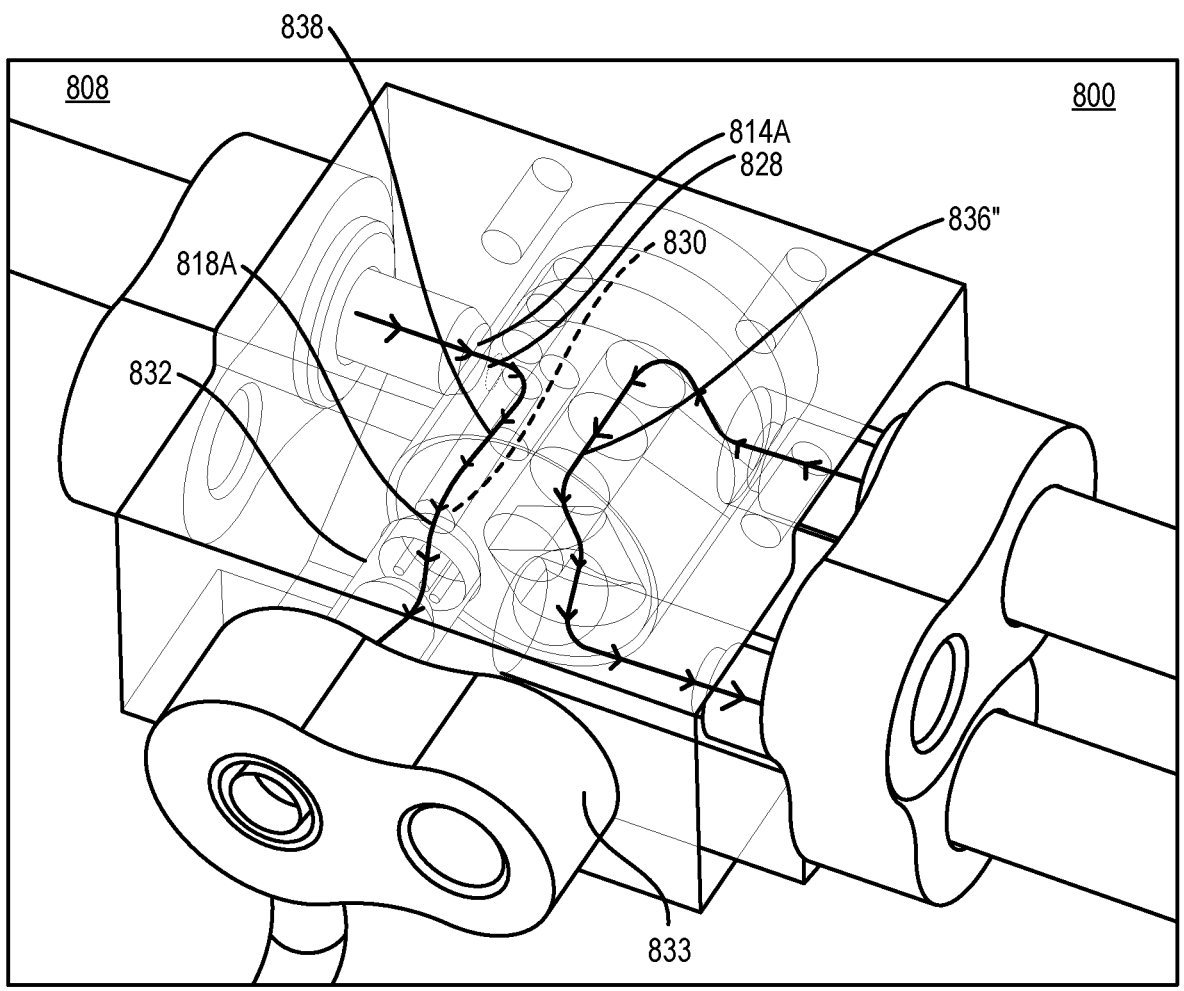

FIG. 3 shows an example of a thermal system 300 in which the rotary valve 100 of FIG. 1 can be used. The thermal system 300 can be used with one or more other examples described elsewhere herein. The thermal system 300 includes a compressor 302. Any of multiple types of compressors suitable for the fluid(s) of a thermal system can be used. For example, the compressor 302 can be powered by an electric motor. The thermal system 300 includes a heat pump rotary valve 304 that is coupled to the compressor 302. In some implementations, the rotary valve 100 in FIG. 1 can be used as the heat pump rotary valve 304. For example, the compressor 302 can be coupled to the heat pump rotary valve 304 using the pipe 118 and the fitting 116 in FIG. 1.

The thermal system 300 includes an ambient air condenser 306 that is coupled to the heat pump rotary valve 304. For example, the ambient air condenser 306 can be coupled to the heat pump rotary valve 304 using the pipe 124 and the fitting 122 in FIG. 1. The ambient air cooled condenser 306 can serve to remove heat from a refrigerant using ambient air. The ambient air condenser 306 can have at least one fan.

The thermal system 300 includes a check valve 308 that is coupled to the ambient air condenser 306. The check valve 308 is here coupled to an opposite side of the ambient air condenser 306 than where the heat pump rotary valve 304 is coupled.

The thermal system 300 includes an expansion valve 310 that is coupled to the check valve 308. The expansion valve 310 is here coupled to an opposite side of the check valve 308 than where the ambient air condenser 306 is coupled. For example, the check valve 308 can allow flow in a direction from the ambient air condenser 306 toward the expansion valve 310, but not in the opposite direction.

The thermal system 300 includes a battery chiller 312 that is coupled to the expansion valve 310. The battery chiller 312 is here coupled to an opposite side of the expansion valve 310 than where the check valve 308 is coupled. The battery chiller 312 can also be coupled to a coolant loop 314. In some implementations, the battery chiller 312 can use the coolant loop 314 for cooling or heating a battery (not shown) of a vehicle where the thermal system 300 is implemented.

The thermal system 300 includes a cabin heating condenser 316. The cabin heating condenser 316 can be coupled to the check valve 308 and the expansion valve 310. The cabin heating condenser 316 can serve to provide heat for a passenger cabin of a vehicle where the thermal system 300 is implemented. In some implementations, a liquid-cooled condenser can be used instead of, or together with, the cabin heating condenser 316.

The thermal system 300 includes an expansion valve 318. The expansion valve 318 can be coupled to the check valve 308 and the expansion valve 310. The expansion valve 318 is here coupled to an opposite side of the expansion valve 310 than where the battery chiller 312 is coupled.

The thermal system 300 includes a cabin evaporator 320. The cabin evaporator 320 can be coupled to an opposite side of the expansion valve 318 than where the expansion valve 310 is coupled. The cabin evaporator 320 can serve to cool and/or remove moisture from the air flowing over the cabin evaporator 320. An opposite side of the cabin evaporator 320 than where the expansion valve 318 is coupled can be coupled to the battery chiller 312 and to the compressor 302. That is, the cabin evaporator 320 can be coupled to an opposite side of the battery chiller 312 from where the expansion valve 310 is coupled, and the cabin evaporator 320 can be coupled to an opposite side of the compressor 302 from where the heat pump rotary valve 304 is coupled.

The thermal system 300 includes a charge management line 322 that couples a port of the heat pump rotary valve 304 with the battery chiller 312 and the cabin evaporator 320.

The thermal system 300 includes a shut-off valve 324. The shut-off valve 324 can be coupled between a port of the heat pump rotary valve 304 and the cabin heating condenser 316.

FIGS. 4-7 schematically show examples of modes 400-406 of operation for a rotary valve 408. The rotary valve 408 and/or the modes 400-406 can be used with one or more other examples described elsewhere herein.

In the mode 400, the rotor of the rotary valve 408 is positioned so that a port 410 of the rotary valve 408 is coupled to a port 412 of the rotary valve 408. For example, the port 410 can have a pipe extending to a compressor discharge port, and the port 412 can have a pipe extending to an inlet of an ambient air condenser. By contrast, ports 414 and 416 of the rotary valve 408 are not coupled to any of the ports 410 or 412, or to each other, in the mode 400. For example, the port 414 can have a pipe extending to a cabin heating condenser, and the port 416 can have a port extending to a suction port of the compressor. In some implementations, the mode 400 can be used for normal refrigeration cycle operation, and couples the compressor discharge gas to the inlet of the ambient air condenser. For example, the mode 400 can be used when the system is providing cooling to either a passenger cabin, a battery, and/or any other devices in the vehicle that may need cooling (e.g., as part of a standard refrigeration cycle) and is dumping the heat outside the vehicle.

In the mode 402, the rotor of the rotary valve 408 is positioned so that the port 410 is coupled to the ports 412 and 414. By contrast, the port 416 is not coupled to any of the ports 410, 412, or 414, in the mode 402. In some implementations, the mode 402 can be used to proportion between the ambient air condenser and the cabin heating condenser during cabin heat pump operation. This can help manage the heat load at each of the condensers in the case of overheating of the cabin inlet air under certain mild to warm ambient conditions and dehumidification/reheat operating conditions. For example, the proportion of refrigerant flowing to one of the ambient air condenser and the cabin heating condenser can be set anywhere between 0-100%, with a corresponding amount flowing to the other of the ambient air condenser and the cabin heating condenser.

In the mode 404, the rotor of the rotary valve 408 is positioned so that the port 410 is coupled to the port 414. By contrast, the ports 412 and 416 are not coupled to any of the ports 410 or 414, or to each other, in the mode 402. In some implementations, the mode 404 is a heat pump mode and can be used to connect the compressor discharge gas to the inlet of the cabin heating condenser and/or the liquid cooled condenser. For example, the mode 404 can be used when the system is providing heating to the cabin (e.g., from the ambience or a battery pack) during cold ambient conditions.

In the mode 406, the rotor of the rotary valve 408 is positioned so that the port 410 is coupled only to the port 414, and so that the port 412 is coupled only to the port 416. The mode 406 can also be a heat pump mode and can be used to connect the ambient air condenser to the compressor suction line to draw refrigerant charge out that may otherwise be stuck in the air condenser. In some implementations, this can help maintain and manage the charge during cabin heat pump operation. For example, there may be scenarios where the amount of refrigerant in the cabin heating loop is not enough, because there is some refrigerant trapped in the outside (ambient) condenser loop.

FIGS. 8-11 show examples of a rotary valve 800 according to modes 802-808 of operation. The rotary valve 800 and/or the modes 802-808 can be used with one or more other examples described elsewhere herein. The rotary valve 800 is here shown partially transparent for illustrative purposes. The rotary valve 800 includes a rotor 810 having a cylindrical surface that abuts a surface of a cylindrical cavity in a body of the rotary valve 800. The body of the rotary valve 800 also includes passages 812-818. The passages 812-818 are formed in the material(s) making up the body of the rotary valve 800. The passages 812-818 can be machined or molded, to name just two examples. The passages 812-816 terminate at respective ports at the surface of the cylindrical cavity. Particularly, the passage 812 terminates at a port 812A, the passage 814 terminates at a port 814A, and the passage 816 terminates at a port 816A. The passage 818 terminates at a port 818A within the cylindrical cavity that faces an end surface of the rotor 810. The end surface of the rotor 810 is adjacent the cylindrical surface of the rotor 810.

The rotor 810 has a center bore 820. The center bore 820 can be approximately parallel with a rotation axis of the rotor 810. For example, the center bore 820 can have substantially a cylindrical shape. The center bore 820 can extend along some or all of the length of the rotor 810.

The rotor 810 can have one or more openings defining channels. In some implementations, the rotor 810 has an opening 822 in the cylindrical surface. A channel extends between the opening 822 and the center bore 820. In some implementations, the opening 822 has substantially a rectangular shape on the cylindrical surface. For example, a longer side of the rectangular shape can extend circumferentially along a direction of rotation of the rotor 810.

In some implementations, the rotor 810 has an opening 824 in the cylindrical surface. The opening 824 defines a channel extending between the cylindrical surface and the center bore 820. In some implementations, the openings 822 and 824 can be positioned opposite each other across the center bore 820.

In some implementations, the rotor 810 has an opening 826 in the cylindrical surface. The opening 826 defines a channel extending between the cylindrical surface and the center bore 820. In some implementations, the opening 826 has substantially a rectangular shape on the cylindrical surface. The rectangular shape of the opening 826 can be different from, or the same as, the rectangular shape of the opening 822. In some implementations, a longer side of the rectangular shape of the opening 826 can extend circumferentially along the direction of rotation of the rotor 810. For example, the longer side of the rectangular shape of the opening 826 can be longer than the longer side of the rectangular shape of the opening 822. In some implementations, the openings 822 and 826 can be positioned on opposite sides of the center bore 820 and are offset from each other along a rotation axis of the rotor 810. For example, the offset can ensure that the opening 822 can align with the passage 812, and that the opening 826 can align with the passage 816.

In some implementations, the rotor 810 can consist of a single piece of material without any joints. For example, the rotor 810 is not formed by joining together two or more pieces. The rotor 810 can be formed from cylindrical stock (e.g., of metal or a composite material). In some implementations, one or more channels can be machined into the single piece of material. For example, the channels defined by one or more of the center bore 820, the opening 822, the opening 824, the opening 826, the opening 828, or the opening 830, can be machined (e.g., drilled or routed) from a workpiece to form the rotor 810.

The body of the rotary valve 800 can include a check valve 832. The check valve 832 can be positioned at the port 818A. For example, a spring of the check valve 832 (e.g., the spring 134 in FIG. 1) can be retained by a fitting 833.

In the mode 802, the rotor 810 has a first rotational position within the cylindrical cavity. In the first rotational position, the opening 822 faces the port 812A. That is, the mode 802 can include multiple possible first rotational positions, in each of which the opening 822 faces the port 812A. Within the mode 802, the rotor 810 can be swept (i.e., rotated in either direction about its axis) and position adjusted into any of the multiple possible first rotational positions. For example, this can be done to suit the needs of the system. In the first rotational position, the opening 824 faces the port 814A. In the first rotational position, the opening 826 is covered by a part of the surface of the cylindrical cavity. In the first rotational position, the opening 830 at the end surface of the rotor 810 is covered by the valve body. As such, in the mode 802, a flow 834, here schematically represented as a line with arrows, can occur in a channel extending between the ports 812A and 814A. The direction of the arrows of the flow 834 is shown for illustrative purposes only. That is, the channel between the openings 822 and 824, including at least part of the center bore 820, can conduct flow in the mode 802. In the mode 802, the port 812A is connected only to the port 814A, and the flow does not reach the ports 816A or 818A.

In the mode 804, the rotor 810 has a second rotational position within the cylindrical cavity. In the second rotational position, the opening 822 faces the port 812A. In the second rotational position, the opening 824 faces the port 814A. In the second rotational position, the opening 826 faces the port 816A. In the second rotational position, the opening 830 at the end surface of the rotor 810 is covered by the valve body. That is, the mode 804 can include multiple possible second rotational positions, in each of which the opening 822 faces the port 812A, the opening 824 faces the port 814A, the opening 826 faces the port 816A, and the opening 830 at the end surface of the rotor 810 is covered by the valve body. Within the mode 804, the rotor 810 can be swept (i.e., rotated in either direction about its axis) and position adjusted into any of the multiple possible second rotational positions. For example, this can be done to suit the needs of the system. As such, in the mode 804, a flow 834' can occur in a channel extending between the ports 812A and 814A. The flow 834' can correspond to the flow 834. Also, in the mode 804, a flow 836, here schematically represented as a line with arrows, can occur in a channel extending between the ports 812A and 816A. The channel for the flow 836 can include the opening 822, the center bore 820, and the opening 826. The direction of the arrows of the flows 834' and 836 is shown for illustrative purposes only. Adjusting the rotational position of the rotor 810 can proportion the relative amounts of fluid flow between the flows 834' and 836. That is, the channel between the openings 822, 824, and 826, including at least part of the center bore 820, can conduct flow in the mode 804. In the mode 804, the port 812A is connected only to the ports 814A and 816A, and the flow does not reach the port 818A.

In the mode 806, the rotor 810 has a third rotational position within the cylindrical cavity. In the third position, the opening 822 faces the port 812A. In the third rotational position, the opening 824 is covered by another part of the surface of the cylindrical cavity. In the third rotational position, the opening 826 faces the port 816A. In the third rotational position, the opening 830 at the end surface of the rotor 810 is covered by the valve body. That is, the mode 806 can include multiple possible third rotational positions, in each of which the opening 822 faces the port 812A, the opening 824 is covered by another part of the surface of the cylindrical cavity, the opening 826 faces the port 816A, and the opening 830 at the end surface of the rotor 810 is covered by the valve body. Within the mode 806, the rotor 810 can be swept (i.e., rotated in either direction about its axis) and position adjusted into any of the multiple possible third rotational positions. For example, this can be done to suit the needs of the system. As such, in the mode 806, a flow 836', here schematically represented as a line with arrows, can occur in a channel extending between the ports 812A and 816A. The flow 836' can correspond to the flow 836. The direction of the arrows of the flow 836' is shown for illustrative purposes only. That is, the channel between the openings 822 and 826, including at least part of the center bore 820, can conduct flow in the mode 806. In the mode 806, the port 812A is connected only to the port 816A, and the flow does not reach the ports 814A or 818A.

In the mode 808, the rotor 810 has a fourth rotational position within the cylindrical cavity. In the fourth rotational position, the opening 822 faces the port 812A. In the fourth rotational position, the opening 824 is covered by another part of the surface of the cylindrical cavity. In the fourth rotational position, the opening 826 faces the port 816A. In the fourth rotational position, the opening 828 faces the port 814A. In the fourth rotational position, the opening 830 at the end surface of the rotor 810 faces the port 818A. That is, the mode 808 can include multiple possible fourth rotational positions, in each of which the opening 822 faces the port 812A, the opening 824 is covered by another part of the surface of the cylindrical cavity, the opening 826 faces the port 816A, the opening 828 faces the port 814A, and the opening 830 at the end surface of the rotor 810 faces the port 818A. Within the mode 808, the rotor 810 can be swept (i.e., rotated in either direction about its axis) and position adjusted into any of the multiple possible third rotational positions. For example, this can be done to suit the needs of the system. As such, in the mode 808, a flow 836", here schematically represented as a line with arrows, can occur in a channel extending between the ports 812A and 816A. The flow 836" can correspond to the flow 836' or the flow 836. Also, in the mode 808, a flow 838, here schematically represented as a line with arrows, can occur in a channel extending between the ports 814A and 818A. The channel defined by the openings 828 and 830 is not connected to the center bore 820. The direction of the arrows of the flows 836" and 838 is shown for illustrative purposes only. That is, the channel between the openings 822 and 826, including at least part of the center bore 820, can conduct flow in the mode 808. Also, the channel between the openings 828 and 830 can conduct flow in the mode 808. In the mode 808, the port 812A is connected only to the port 816A, and the port 814A is connected only to the port 818A.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A rotary valve comprising:
   a valve body having a cylindrical cavity;
   a rotor having a cylindrical surface that abuts a surface of the cylindrical cavity, the rotor including:
      a center bore;
      a first channel extending between the center bore and a first opening in the cylindrical surface, wherein the first opening has substantially a first rectangular shape on the cylindrical surface, a longer side of the first rectangular shape extending circumferentially along a direction of rotation of the rotor;
      a second channel extending between the center bore and a second opening in the cylindrical surface;
      a third channel extending between the center bore and a third opening in the cylindrical surface; and
      a fourth channel not connected to the center bore, the fourth channel extending between a fourth opening in the cylindrical surface and a fifth opening at an end surface of the rotor, the end surface adjacent the cylindrical surface; and
   ports extending through the valve body between the surface of the cylindrical cavity and an outside of the valve body.

2. The rotary valve of claim 1, wherein the third opening has substantially a second rectangular shape on the cylindrical surface, a longer side of the second rectangular shape extending circumferentially along the direction of rotation of the rotor.

3. The rotary valve of claim 2, wherein the longer side of the first rectangular shape is longer than the longer side of the second rectangular shape.

4. The rotary valve of claim 1, wherein the center bore has substantially a cylindrical shape.

5. The rotary valve of claim 1, wherein the rotor consists of a single piece of material without any joints, and wherein the first, second, third, and fourth channels are machined into the single piece of material.

6. The rotary valve of claim 1, wherein the first and second openings are positioned opposite each other across the center bore.

7. A rotary valve comprising:
a valve body having a cylindrical cavity;
a rotor having a cylindrical surface that abuts a surface of the cylindrical cavity, the rotor including:
 a center bore;
 a first channel extending between the center bore and a first opening in the cylindrical surface;
 a second channel extending between the center bore and a second opening in the cylindrical surface;
 a third channel extending between the center bore and a third opening in the cylindrical surface; and
 a fourth channel not connected to the center bore, the fourth channel extending between a fourth opening in the cylindrical surface and a fifth opening at an end surface of the rotor, the end surface adjacent the cylindrical surface; and
ports extending through the valve body between the surface of the cylindrical cavity and an outside of the valve body;
wherein the first and third openings are positioned on opposite sides of the center bore and are offset from each other along a rotation axis of the rotor.

8. The rotary valve of claim 1, further comprising a check valve in the valve body.

9. The rotary valve of claim 8, wherein the check valve faces the end surface of the rotor.

10. The rotary valve of claim 8, further comprising a spring that biases the check valve, the spring retained by a fitting attached to at least one of the ports.

11. The rotary valve of claim 1, further comprising an actuator attached to the valve body, the actuator configured to rotate the rotor within the cylindrical cavity.

12. A rotary valve comprising:
a valve body having a cylindrical cavity;
a rotor having a cylindrical surface that abuts a surface of the cylindrical cavity, the rotor including:
 a center bore;
 a first channel extending between the center bore and a first opening in the cylindrical surface;
 a second channel extending between the center bore and a second opening in the cylindrical surface;
 a third channel extending between the center bore and a third opening in the cylindrical surface; and
 a fourth channel not connected to the center bore, the fourth channel extending between a fourth opening in the cylindrical surface and a fifth opening at an end surface of the rotor, the end surface adjacent the cylindrical surface; and
ports extending through the valve body between the surface of the cylindrical cavity and an outside of the valve body;
wherein the rotary valve has a first mode of operation corresponding to a first rotational position of the rotor within the cylindrical cavity, and wherein in the first rotational position of the rotor:
 the first opening in the cylindrical surface faces a first port of the ports;
 the second opening in the cylindrical surface faces a second port of the ports;
 the third opening in the cylindrical surface is covered by a part of the surface of the cylindrical cavity; and
 the fifth opening at the end surface of the rotor is covered by the valve body.

13. The rotary valve of claim 12, further having also a second mode of operation corresponding to a second rotational position of the rotor within the cylindrical cavity, wherein in the second rotational position of the rotor:
 the first opening in the cylindrical surface faces the first port;
 the second opening in the cylindrical surface faces the second port;
 the third opening in the cylindrical surface faces a third port of the ports; and
 the fifth opening at the end surface of the rotor is covered by the valve body.

14. The rotary valve of claim 13, wherein the second mode of operation corresponds to each of multiple second rotational positions of the rotor within the cylindrical cavity, the multiple second rotational positions of the rotor corresponding to respective different proportions between flow through the first channel and flow through the second channel.

15. The rotary valve of claim 13, further having also a third mode of operation corresponding to a third rotational position of the rotor within the cylindrical cavity, wherein in the third rotational position of the rotor:
 the first opening in the cylindrical surface faces the first port;
 the second opening in the cylindrical surface is covered by another part of the surface of the cylindrical cavity;
 the third opening in the cylindrical surface faces the third port; and
 the fifth opening at the end surface of the rotor is covered by the valve body.

16. The rotary valve of claim 15, further having also a fourth mode of operation corresponding to a fourth rotational position of the rotor within the cylindrical cavity, wherein in the fourth rotational position of the rotor:
 the first opening in the cylindrical surface faces the first port;
 the second opening in the cylindrical surface is covered by the other part of the surface of the cylindrical cavity;
 the third opening in the cylindrical surface faces the third port;
 the fourth opening faces the second port; and
 the fifth opening at the end surface of the rotor faces a fourth port of the ports.

17. The rotary valve of claim 1, wherein a portion of the fourth channel ending at the fifth opening at the end surface of the rotor is substantially parallel with the center bore.

18. A rotary valve comprising:
a valve body having a cylindrical cavity;
first, second, third, and fourth ports, each of the first, second, third, and fourth ports extending through the valve body between a surface of the cylindrical cavity and an outside of the valve body; and
a rotor having a cylindrical surface that abuts the surface of the cylindrical cavity, the rotor including:
 first means for conducting flow in a first mode of operation, wherein in the first mode of operation the first port is connected only to the second port, and the flow does not reach the third and fourth ports;

second means for conducting flow in a second mode of operation, wherein in the second mode of operation the first port is connected only to the second and third ports, and the flow does not reach the fourth port;

third means for conducting flow in a third mode of operation, wherein in the third mode of operation the first port is connected only to the third port, and the flow does not reach the second and fourth ports; and fourth means for conducting flow in a fourth mode of operation, wherein in the fourth mode of operation the first port is connected only to the third port, and the second port is connected only to the fourth port.

19. The rotary valve of claim 18, the second means further controlling a proportion between (i) flow between the first port and the second port, and (ii) flow between the first port and the third port.

* * * * *